No. 733,919. PATENTED JULY 14, 1903.
J. SCHWARTZ.
IMPLEMENT HANDLE.
APPLICATION FILED DEC. 3, 1902.
NO MODEL.
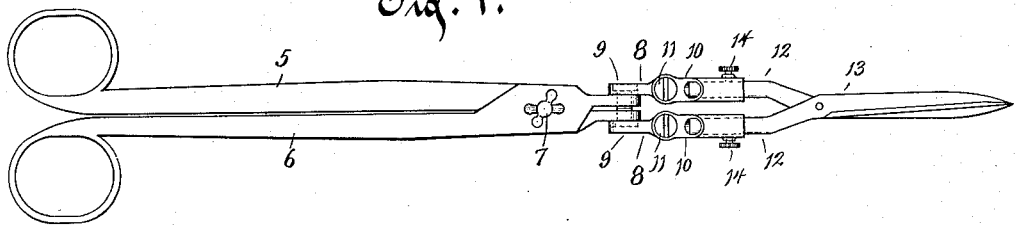
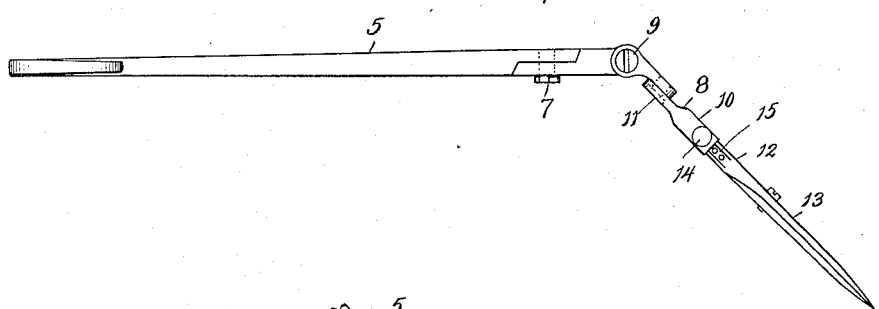
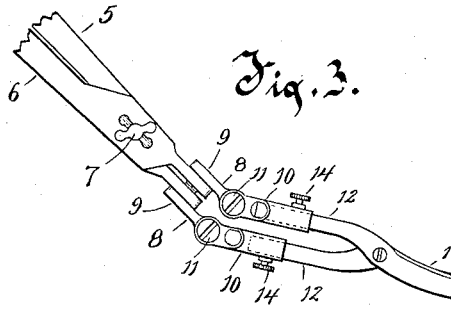
Witnesses.
Inventor.
Josef Schwartz No. 733,919. Patented July 14, 1903.

UNITED STATES PATENT OFFICE.

JOSEF SCHWARTZ, OF MILWAUKEE, WISCONSIN.

IMPLEMENT-HANDLE.

SPECIFICATION forming part of Letters Patent No. 733,919, dated July 14, 1903.

Application filed December 3, 1902. Serial No. 133,684. (No model.)

*To all whom it may concern:*

Be it known that I, JOSEF SCHWARTZ, residing at Milwaukee, in the county of Milwaukee and State of Wisconsin, have invented a new and useful Improvement in Implement-Handles, of which the following is a description, reference being had to the accompanying drawings, which are a part of this specification.
The object of my invention is to provide a novel means for holding and operating a pair of scissors, shears, forceps, pincers, or other tool consisting of crossed and pivoted members in any one of many positions in which it may be desired to use them, either straight out or in oblique position toward the right, the left, or up or down, with reference to said means or handle for thus holding and operating them. While my novel means are adapted for holding and operating scissors, shears, forceps, or other tool consisting of crossed and pivoted members, it will be sufficient in this specification to designate my novel device as an "implement-handle." The invention consists of the implement-handle, its parts, and combinations of parts, as herein described and claimed, or the equivalents thereof.

In the drawings, Figure 1 shows my improved implement-handle with a pair of straight-bladed scissors mounted thereon. Fig. 2 is an edge view of my improved handle with the straight-bladed scissors of Fig. 1 mounted thereon, the scissors being turned and adjusted to an oblique angle laterally to the length of the handle. Fig. 3 shows a fragment of the handle with a pair of curved-bladed scissors mounted thereon and adjusted to an upwardly-projecting oblique angle to the length of the handle. Fig. 4 shows merely a pair of scissors having laterally-curved blades and adapted to be mounted on my improved handle.

While my improved handle is adapted to hold and operate any tool or implement consisting of crossed and pivoted members, like scissors, forceps, pincers, or the like, I have deemed it sufficient to show only a few forms of scissors that may be mounted and operated on the handle. It will, however, be understood that any of these tools having their shanks properly constructed may be applied to and operated by my improved handle interchangeably.

In the drawings, 5 and 6 represent two members of the handle, which are crossed and secured together pivotally by a pivot 7 in such manner as is now common with shears, surgical instruments, &c. The pivot is provided with an elongated head adapted to pass through a slot therefor in one member of the handle when the two members of the handle are sufficiently spread apart therefor, thus permitting the handles to be separated, as is common in surgical implements.

On each member 5 and 6, at the front extremity thereof, there is pivoted a short joint member 8, advisably by means of a screw 9, the axis of which screw-pivots severally is at a right angle to the length of the pivot 7, or, in other words, is at a right angle to the pivot of the members 5 and 6. On the front end of each joint member 8 there is pivoted an implement-holding member 10, advisably by means of a screw 11, the axis of which is at a right angle to the axis of the pivot 9. Each of these members 10 is provided with means for receiving and holding the shanks 12 of a crossed and pivoted tool 13. Preferably these means consist of a socket in the outer end of the member 10 and at a right angle to the pivot 11, and some means, as a set-screw 14, turning through the wall of the socket and adapted to bear against the shank of the tool, advisably entering recesses 15, provided therefor in the shank of the tool, is provided for locking the shanks in the sockets. The shanks 12 of the tool 13 must always be so formed as to be adapted to enter and to be removed from the sockets or holding devices, and by this means tools are made interchangeable on the implement-handle. It will be understood that this construction provides a kind of universal joint or adjustment for the tool with reference to the position of the handle, so that, as shown in Fig. 2, the tool can be turned laterally on the pivots 9, and, if desired, these pivots when screws are employed therefor may be turned down, so as to lock the members 8 in position on the handle members 5 and 6. The members 10 10 must always be pivoted and movable on the pivots 11. Also it will be seen that by releasing one shank 12 in its socket in the member 10 it can be drawn out somewhat, as shown in Fig. 3, and then secured in place, thus setting the tool at an angle upwardly or downwardly with reference to the members 5 and 6 of the handle. By these methods the tool may be adjusted to almost any angle toward the right or left, or upwardly or downwardly, or to an oblique position, including both lateral and upward or downward inclinations, as desired. When the tool is thus mounted on the implement-handle to the desired angle, it can be readily operated in such manner as scissors or surgical instruments of this general form are manipulated.

This improved handle is adapted for use with many kinds of tools, especially with those employed by surveyors, tinsmiths, roofers, tailors, &c.

What I claim as my invention is—

1. An implement-handle, comprising crossed and pivoted handle members, joint members pivoted on the extremities of the handle members by pivots at right angles to the pivot of the handle members, and tool-holding members pivoted on the joint members by pivots at right angles to the pivots connecting the joint members to the handle members.

2. An implement-handle, comprising crossed and pivoted handle members, joint members pivoted on the extremities of the handle members by pivots at right angles to the pivot of the handle members, tool-holding members pivoted on the joint members by pivots at right angles to the pivots connecting the joint members to the handle members, and means on the tool-holding members to receive and hold the shanks of a tool adjustably and extensibly thereon.

3. An implement-handle, comprising crossed and pivoted handle members, joint members pivoted on the handle members by pivots at right angles to the pivot of the handle members, tool-holding members pivoted on the joint members by pivots at right angles to the pivots connecting the joint members to the handle members, the tool-holding members being provided with longitudinal sockets for receiving therein removably the shanks of a tool, and having means for locking the shanks of the tool in the sockets of the tool-holding members.

4. An implement-handle, comprising crossed and pivoted handle members, and tool-holding members mounted on the extremities of the members pivotally and having means for holding the shanks of a tool comprising crossed and pivoted members, and so that the opening and closing of the handle members will synchronously open and close the tool members.

In testimony whereof I affix my signature in presence of two witnesses.

JOSEF SCHWARTZ.

Witnesses:
C. T. BENEDICT,
ALMA KLUG.